Figure 1A:
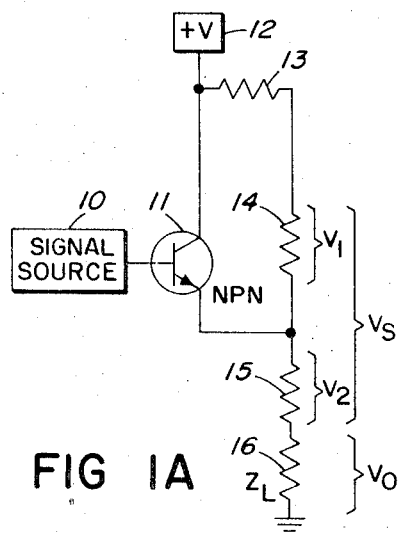

United States Patent

[11] 3,585,514

[72] Inventor Arthur P. Kubicz
 Richardson, Tex.
[21] Appl. No. 749,548
[22] Filed Aug. 1, 1968
[45] Patented June 15, 1971
[73] Assignee Collins Radio Company
 Cedar Rapids, Iowa

[54] POWER RESPONSIVE OVERLOAD SENSING CIRCUIT
 9 Claims, 7 Drawing Figs.
[52] U.S. Cl. ........................................... 330/11,
 330/24, 330/16
[51] Int. Cl. .............................................. H03f 21/00,
 H03f 3/04
[50] Field of Search ............................... 330/40, 22,
 24, 13, 11, 91; 307/202; 329/169, 173

[56] References Cited
 UNITED STATES PATENTS
 2,832,900 4/1958 Ford ........................... 307/202 X
 3,365,675 1/1968 Gaddy et al. ................. 330/192
 3,454,787 7/1969 Gelernter ..................... 307/235

*Primary Examiner*—Nathan Kaufman
*Attorneys*—Warren H. Klintzinger and Robert J Crawford

ABSTRACT: A power responsive overload sensing and protective circuit for the protection of an active electrical device developing an output to a load with resistive means between two electrodes of the active device, a resistor between an electrode of the device and the load and with the resistive means, the resistor, and the load connected in series between a voltage power supply and ground. The circuit includes a voltage value threshold level sensing detector having two inputs connected across a section of the resistive means and the resistor, and an output connected to a clamp device in turn connected between a signal input path to the active device and ground. The resistive values of the resistive means and the resistor are value selected to insure the development of predetermined voltage ratios between the voltage supplied and the voltage across the load. In one embodiment resistor values of the resistive means are so chosen that the voltage developed across one of them is quantitatively substantially equal to the voltage developed across the resistor connected to the load when the voltage developed across the load is approximately equal to one-half the voltage supplied.

INVENTOR.
ARTHUR P. KUBICZ
BY
Warren H. Kintzinger
ATTORNEY

PATENTED JUN 15 1971  3,585,514

INVENTOR.
ARTHUR P. KUBICZ

BY
Warren H. Kinlinger
ATTORNEY

POWER RESPONSIVE OVERLOAD SENSING CIRCUIT

This invention relates in general to power overload sensing and circuit protecting systems, and in particular, to a power responsive overload sensing and protection providing circuit with very rapid substantially instantaneous sensing of and reaction to power overloads.

The invention described herein was made in the performance of work under a NASA contract and is subject to the provisions of Section 305 of the National Aeronautics and Space Act of 1958, Public Law 85—568 (72 Stat. 435; 42 U.S.C. 2457).

Protection of active electrical devices from power overloads, for example, accidental short circuit of an amplifier output, has been a significant well-known problem with electrical circuits. The problem is particularly significant with the introduction of various active solid state devices, such as transistors, that have come into very wide use, especially since such devices are notably unforgiving of overloads. Please note, however, that applicant's s protective system embodiments are quite applicable to other active devices such as vacuum tubes, motors, generators and others. Generally, every practical active device has performance and power limit specifications which must be observed if a useful service life is to be obtainable, with, for example, such limit specifications for transistors being collector current, collector emitter voltage, and collector power dissipation. While overvoltage and overcurrent conditions are relatively easy to guard and protect against the more troublesome and usual failure mode is power overload where neither collector emitter voltage nor current maximum are necessarily exceeded. One method for obtaining protection from over-dissipation that has been employed is to place a thermal sensor in good contact with a transistor mounting or case with the sensor also connected to appropriate control circuitry capable of deenergizing the transistor circuit in response to an overheat condition. The significant deficiency in this approach is the unavoidably long thermal time constant between the power dissipating transistor junction to be protected and the sensor measuring heat thereby preventing any reasonably rapid protective control response. Another method for achieving power protection, and, in this instance, on a substantially instantaneous response basis, is through use of a simple computer connected and utilized for maintaining a continuous computation of dissipation from the collector voltage and current measurements as computer information inputs, with the computer also providing feed to threshold deenergizing circuits. This, quite obviously, is relatively a very expensive and elaborate power overload protection approach practical only for very special circumstances.

It is, therefore, a principal object of this invention to provide a power responsive overload sensing circuit capable of substantially instantaneous sensing of and reaction to power overloads.

Another object is to provide such a relatively simple inexpensive power overload protective circuit advantageously providing substantially the same beneficial protective results as with some of the computer power overload protective systems without the relatively great expense and complexity associated with such computer systems.

A further object is to lessen space requirements in providing such protection with protective output control fast, with operation intervals easily controlled, and with operation not disturbed by reactive loads.

Features of this invention useful in accomplishing the above objects include, in power responsive overload sensing and protective circuit systems for the protection of active electrical devices, the use of impedance means between two electrodes of an active electrical device with one of these electrodes connected to an elevated voltage potential source and the other of the electrodes connected to an impedance connected in series with the output load and through the output load to ground. A typical circuit utilizing applicant's power responsive overload sensing circuit is an NPN transistor amplifier having a signal input connection from a signal source to the base of the transistor, a collector connection to a voltage supply and an emitter connection through a resistor to the output load and through the output load to ground. This circuit also includes two resistors series connected between the collector and the emitter of the NPN transistor. A two input threshold detector has one input connected between a common junction of the resistors connected between the collector and emitter of the NPN transistor and the other input connected to the common junction of the resistor and load connection. The output of the threshold detecting circuit is connected as an input to a clamp circuit also having a connection to ground and an output connection to the base of the NPN transistor. The resistor connected between the emitter and the load is essential to operation of applicant's invention with $Z_L$ representing the load. The first resistor immediately connected to the collector and to the voltage supply is so value selected as to insure such current flow through the other resistor connected between the transistor collector and emitter that when the voltage developed thereby across that particular resistor is approximately equal to the voltage developed across the resistor connected in series between the emitter and the load $Z_L$ when the voltage $V_o$ developed across the load resistance $Z_L$ is approximately equal to one-half the voltage $V_c$ of the voltage supply. One reason for these selections is to insure that the current flow through the second resistor connected between the collector and the emitter of the transistor be much smaller than the total current flow from the voltage supply source through the circuit including the load to ground. With the optimized voltages as set forth above the voltage $V_s$ developed across the two interconnected resistors, the second resistor between the collector and emitter and the series connected resistor between the emitter and the load is so controlled by the threshold detecting circuit and the clamping circuit so as to remain substantially constant. This is with any increase in load current causing the voltage developed across the resistor in series with the load and thereby the voltage $V_s$ to increase, and this, through its effect on the threshold detector in controlling the protecting circuit, causes the transistor through the clamping control applied to the base thereof to go to a safe state.

Specific embodiments representing what are presently regarded as the best modes of carrying out the invention are illustrated in the accompanying drawings.

Figure 1B:
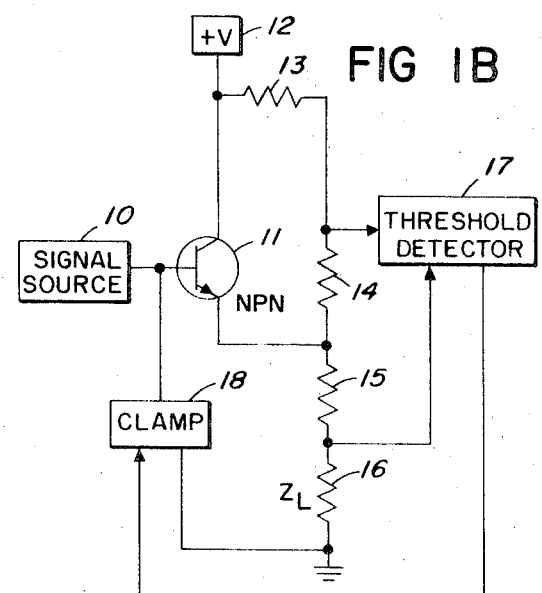
Figure 2:
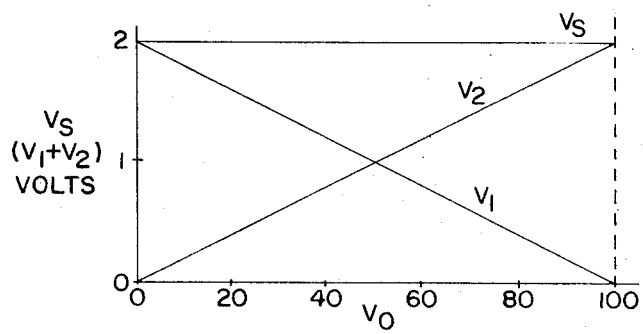
Figure 3:
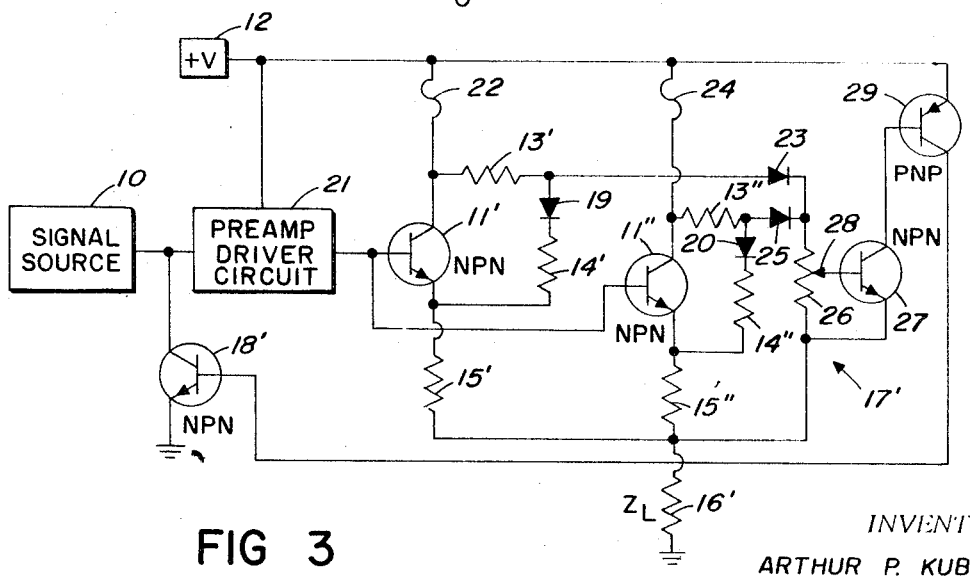
Figure 4:
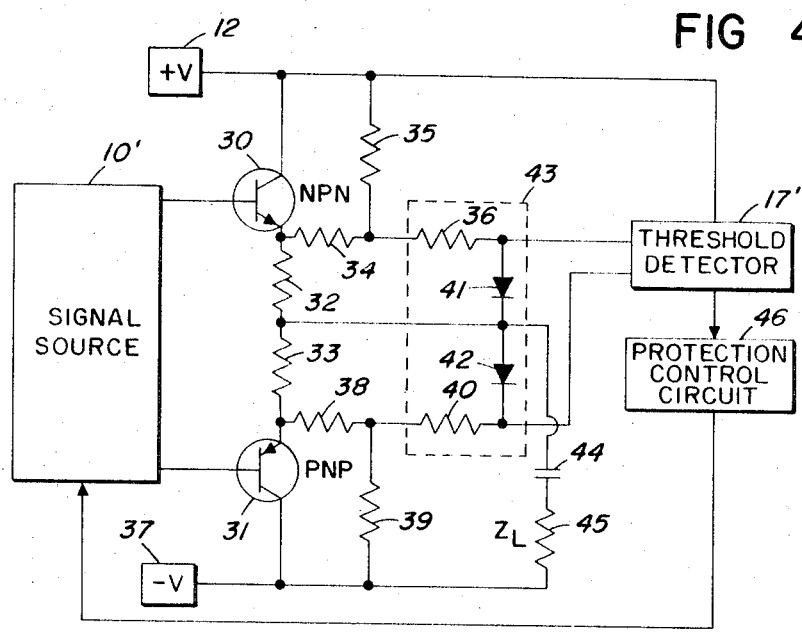
Figure 5A:
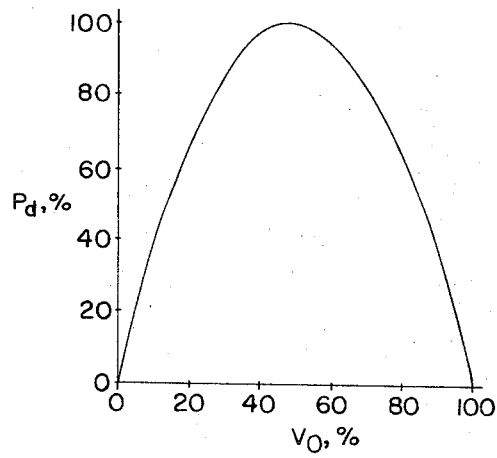
Figure 5B:
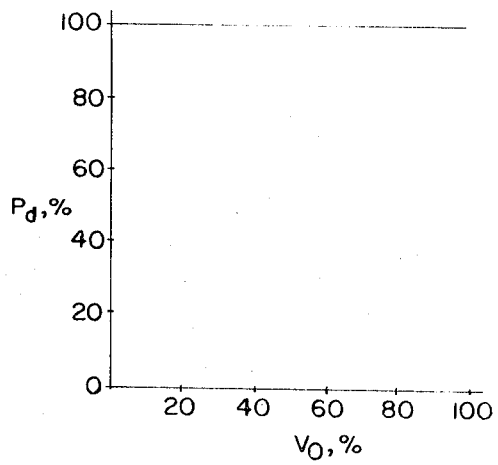

In the drawings:

FIG. 1A represents a schematic of a transistor amplifier circuit receiving and amplifying an input signal and supplying an output to a load, and with various circuit resistive elements developing various voltages with the operational currents therethrough;

FIG. 1B, a schematic of the same circuit as in FIG. 1A also including a threshold detector connected for measuring the voltage developed through two of the resistive elements of the amplifier circuit and providing an output connected to a clamp circuit device for overload sensing control of the circuit;

FIG. 2, the graph of the voltages developed across two of the resistive components of the circuit of FIGS. 1A and 1B and the total voltage $V_s$ across the two resistive elements through a range of voltages $V_o$ developed across the output load during operation;

FIG. 3, a schematic of a two-transistor amplifier circuit and the power overload sensing and protective responsive circuit as applied thereto;

FIG. 4, a schematic block diagram showing how a series push-pull amplifier stage with the power overload sensing and protective circuit so used therewith as to provide true power responsive protection derived from sense voltage shaping;

FIG. 5A, a graph of percent of transistor power dissipation $P_d$ versus percent of voltage $V_o$ developed across the output load for a basic sense circuit such as shown with the circuits of FIGS. 1 and 2; and FIG. 5B, a graph of percent of transistor power dissipation $P_d$, or collector dissipation, as the case may be, versus the percent of voltage $V_o$ developed across the output load useful in indicating the improved operational response characteristics obtained with the shaped sense circuit as employed with the embodiment of FIG. 4.

Referring to the drawings:

In a relatively simple transistor amplifier circuit of FIG. 1A a signal source 10 is connected as the input to the base of NPN transistor 11 having a collector connection to positive voltage supply 12. The voltage supply 12 is also connected serially through resistors 13, 14, and 15 to the output load 16 and through the load, having a characteristic impedance $Z_L$, to ground. The emitter of transistor 11 is connected to the common junction of resistors 14 and 15 across which, respectively, voltages $V_1$ and $V_2$ are developed, and across both of which an operational voltage $V_s$ is developed. Further, an operational voltage $V_o$ is indicated as being developed across the output load impedance $Z_L$. Referring also to FIG. 1B, the same basic amplifying circuit is shown to have a power responsive overload sensing and control circuit added in the form of threshold detector 17 connected for receiving one input from the junction of resistors 13 and 14 and a second input from the junction of resistor 15 and the output load 16. The threshold detector circuit 17 is shown to have an output line connection to clamp device 18 that also has a ground connection and an output connection to the base of NPN transistor 11.

With an operational voltage $V_c$ for the voltage supply 12 equal to 100 volts, $Z_L=50$ ohms, resistor 15=1 ohm, resistor 14=100 ohms, and resistor 13=4.9 ohms please refer to the following tabulated operational relations and to the graph of FIG. 2.

| $V_o$ | $I_L$ | $V_1$ | $V_2$ | $V_s$ |
|---|---|---|---|---|
| 0.0 | 0.0 | 2.0 | 0.0 | 2.0 |
| 10 | 0.2 | 1.8 | 0.2 | 2.0 |
| 30 | 0.6 | 1.4 | 0.6 | 2.0 |
| 50 | 1.0 | 1.0 | 1.0 | 2.0 |
| 70 | 1.4 | 0.6 | 1.4 | 2.0 |
| 90 | 1.8 | 0.2 | 1.8 | 2.0 |
| 100 | 2.0 | 0.0 | 2.0 | 2.0 |

An important facet is that the sense voltage, $V_s$, remains, generally, substantially constant. With the circuit overload protective features of FIG. 1B any increase in load current causes $V_2$ and thus $V_s$ to increase. With $V_s$ increased across the inputs to threshold detector circuit 17, a load increase causes transistor 11 to return to a safe power dissipating state.

The circuit configuration of FIG. 3 has actually been used. In this embodiment the parallel connected NPN transistors 11' and 11" are independently monitored through voltage parameter developing resistors 13', 14' and 15', and 13", 14", and 15", and diodes 19 and 20, respectively. The signal source 10 is connected for supplying an input to preamplifier driver circuit 21 with a connection to positive voltage supply 12 and an output connection to the bases of both NPN transistors 11' and 11". The collector of NPN transistor 11' is connected through fuse 22 to positive voltage supply 12, and through resistor 13' to the common junction of the anodes of diodes 19 and 23. The cathode of diode 19 is connected through resistor 14' to the junction of the emitter of transistor 11' with resistor 15'. The other end of resistor 15' is connected both to the load 16' and to threshold detector circuit 17'. The collector of NPN transistor 11" is connected through fuse 24 to positive voltage supply 12, and through resistor 13" to the common junction of the anodes of diodes 20 and 25. The cathode of diode 20 is connected through resistor 14" to the junction of the emitter of transistor 11" with resistor 15". The other end of resistor 15" is connected both to the load 16' and to threshold detector circuit 17'. The common junction of resistors 15' and 15" and the load 16' in the connection to threshold detector circuit 17' is connected in common to an end of resistor 26 and to the emitter of NPN transistor 27. The other end of resistor 26 is connected in common to the cathodes of diodes 23 and 25 with the diodes serving to isolate the respective sense circuits from each other. The NPN transistor 27, functioning as a threshold detector, has a base connection to adjustable tap 28, of the resistor 26, providing a threshold adjustment. The collector of NPN transistor 27 is connected to the base of PNP transistor 29, performing as a DC level shifter and inverter, having an emitter connection to the positive voltage supply 12 and a collector connection to the base of clamp NPN transistor 18'. Transistor 18' as a clamp stage for the audio input, has an emitter connection to ground and a collector connection to the input connection from signal source 10 to preamplifier circuit 21.

Normally during operation transistors 27, 29, and 18' are nonconducting since the base-emitter voltage of NPN transistor 27 is generally too small. However, when an overload condition develops and/or a short occurs, for example, an accidental short circuit across $Z_L$ or either transistor 11' or 11" becomes short-circuited from collector to emitter, the resulting increase in current through either diode 23 or 25, respectively, generally causes transistors 27, 29, and 18' to conduct and thereby clamp the amplifier circuit input from signal source 10 to ground. Further, since the entire modulator amplifier circuit is direct coupled the bases of transistors 11' and 11" are moved toward ground if not actually in fact returned to ground providing partial to complete cutoff of the transistors 11' and 11".

In the occasional case of a shorted transistor 11' or 11", the entire load becomes diverted to the defective transistor. The resulting multiplication of current through that, respective, transistor 11' or 11" as the case may be, causes the respective collector fuse 22 or 24 to open. Then when the power loading returns below the overload threshold for the amplifier transistors, the circuit reverts to normal operation other than for a particular transistor having an open collector fuse.

During a fault condition, the output current will generally be maintained somewhat above zero in order to thereby, as a necessary condition, sustain a clamped state. By increasing the threshold adjustment, the current maintaining the clamped state may be increased to insure that the fuse of a particular shorted or otherwise power overloaded subcircuit will be blown open. Further, by such adjustment it is also possible to provide some measure of control over the onset of a power overload. If activation speed is very important resistors 14' and 14" may be a little larger value resistors to, in effect, make the circuit regenerative in the clamped state and tend to lock the circuit in the clamped state. In the alternative, to have a slower but more controllable clamping action, in the event of subcircuit power overloading, the resistive values of resistors 15' and 15" should be somewhat less. Should temperature compensation be required, suitable temperature reactive elements may be provided in several places in the sensor or threshold circuits.

It is of interest to note that a circuit as shown in FIG. 3, and with circuit values and parameters as set forth hereinafter, advantageously provided power overload protective response time under 10 microseconds. This was with a static load current of 26 amperes at 20 volts and with this power overload repeatedly short circuited through a subcircuit in series with a ½ampere standard fuse without any perceptible change in the fuse.

While applicant's power responsive overload sensing circuit embodiments hereinbefore described may be quite adequate in giving great power overload protection in many ways they generally do not provide circuit facilities for responding to transistor power dissipation. With a substantially constant load impedance, as assumed with the embodiments hereinbefore described, the permissible instantaneous transistor dissipation varies with the ratio of output voltage to supply voltage as indicated in FIG. 5A. With this performance capability obtained with such prior described circuits much of a transistor's operational power capabilities are not realizable particularly when output voltage $V_o$ departs from $V_c/2$ or when the load $Z_L$ is variable.

Optimal true dissipation response behavior may be obtained by processing $V_s$ through a shaping network in thereby attaining a power proportional response characteristic. While this may be accomplished through more than one circuit configuration a specific example is shown in FIG. 4. This refined embodiment employs diodes as squaring elements acting on duo output signal points of a series push-pull power amplifier. In this embodiment two outputs of signal source 10' are applied, respectively, to the bases of NPN transistor 30 and PNP transistor 31 the emitters of which are interconnected by the substantially equal value series connected resistors 32 and 33. The emitter of NPN transistor 30 is also connected through resistor 34 to the common junction of resistors 35 and 36 and on through resistor 35 to positive voltage supply 12 in common with the collector of transistor 30, and with the power supply 12 also connected for supplying voltage to threshold detector 17'. The collector of PNP transistor 31 is connected to negative voltage supply 37 while the emitter thereof is connected through resistor 38 to the common junction of resistors 39 and 40, and on through resistor 39 also to negative voltage supply 37. The ends of resistors 36 and 40 remote from transistors 30 and 31 are interconnected through series connected diodes 41 and 42 with the anodes toward resistor 36 and cathodes toward resistor 40 and with the resistors 36 and 40 and the diodes forming a shaping network 43. The common junction of diodes 41 and 42 is connected to the common junction of resistors 32 and 33 and through capacitor 44 to the output load 45. The junction of resistor 36 and diode 41, and the junction of resistor 40 and diode 42 are connected as sensing connections of shaping network 43 to threshold detector circuit 17' having an output connection to protection control circuit 46 the output of which is connected as a controlling input, or clamp, for signal source 10'. This provides operation power overload sensing and response characteristics as indicated in FIG. 5B with maximum transistor power dissipation having been obtained over the entire operating range. This approach is, advantageously, especially useful, for example, in variable regulated power supply control systems.

Thus, there are hereby provided improved power responsive overload sensing circuits individually providing various operational advantages such as effective inherently fast response to substantially instantaneous transistor power dissipation. With parallel transistor circuits such sensing and control circuitry is readily useable for independently and simultaneously monitoring all the transistors. Further, such circuitry is much less complex, less expensive, and requires less space than with previously known sensing and overload protective systems of the art. Clamp interval behavior may be readily controlled and there is substantially no degredation in operational behavior attributable to reactive loading.

Whereas this invention is herein illustrated and described with respect to specific embodiments thereof, it should be realized that various changes may be made without departing from the essential contributions to the art made by the teachings hereof.

I claim:

1. A power responsive overload sensing circuit for use with electrical signal amplifying devices including: an electrical signal amplifying device having a control electrode, a collector electrode, and an emitter electrode among a plurality of electrode connections with a first electrode connection to a first potential reference source, connection of a second electrode to a second potential reference source, and a third signal input control electrode connection; first resistive means connected between said first and second electrodes; second resistive means connected to said second electrode and in series with a load between said second electrode and said second potential reference source; load terminal means connected between said second resistive means and said second potential reference source; a voltage value threshold detector having at least two voltage level connections, with a first voltage level connection to an intermediate connection point of said first resistive means; with a second voltage level connection to said second resistive means at a connective point displaced from said second electrode connection; and with said first and second voltage level connections spanning at least a section of each of said first and second resistive means.

2. The power responsive overload sensing circuit of claim 1, wherein said third signal input control electrode of said electrical signal amplifying device is connected for receiving a signal input transmitted through signal path means from a signal source; a clamping device; said voltage value threshold detector having an output as an input connection to said clamping device; said clamping device also being provided with a connection to ground as said second potential reference source, and an output connection to said signal path means from a signal source whereby the input signal applied to said third signal input control electrode of said electrical signal amplifying device is subject to being attenuation clamped as determined by the signal level developed out of said voltage value threshold detector and applied to said clamping device.

3. The power responsive overload sensing circuit of claim 2, wherein said first potential reference source is a voltage power source.

4. The power responsive overload sensing circuit of claim 2, wherein said electrical signal amplifying device is a first transistor with the transistor base being said third signal input control electrode connected for receiving the input signal; with said clamping device being a second transistor having a base connection to the output of said threshold detector; the emitter-collector circuit of the second transistor being in a circuit path from said signal path means to said second potential reference source; and with said second potential reference source being ground.

5. The power responsive overload sensing circuit of claim 2, wherein a plurality of said electrical signal amplifying devices are connected in parallel to the input signal source; the said first resistive means of each electrical signal amplifying device is connected to said first voltage level connection of said threshold detector; and connection of said second voltage level connection to the second resistive means of each electrical signal amplifying device.

6. The power responsive overload sensing circuit of claim 5, wherein said first resistive means of each electrical signal amplifying device each include at least two resistors with the junction between resistors of each connected to said first voltage level connection of said threshold detector.

7. The power responsive overload sensing circuit of claim 6, wherein first and second diodes are provided in the circuit with each of said first resistive means with first like diode electrodes connected to and through one of the two resistors to said first potential reference source, the second electrode of said first diode connected to a second of the two resistors of a said first resistive means, and the second electrode of said second diode being connected to the said first voltage level connection of said voltage value threshold detector.

8. The power responsive overload sensing circuit of claim 1, wherein said first resistive means includes a first resistor and a second resistor; said second resistive means is a third resistor; with said first, second, and third resistors series connected in order from said first potential reference source to said load terminal connective means and, on through a load connected in the circuit to said second potential reference source; with said resistors so value selected that current flow through the resistors during operation develops substantially the same quantitative voltage value across said second and third resistors when the voltage developed across the load is approximately equal to one-half the voltage of said first potential reference source; and with said second and third resistors being the respective sections of said first and second resistive means spanned between said first and second voltage level connections of said voltage value threshold detector.

9. A power overload sensing and protective circuit with a series push-pull amplifier stage with substantially true power responsive protection derived from sense voltage shaping wherein: an NPN transistor and a PNP transistor have emitters interconnected by first and second series connected resistors, collectors connected to a positive voltage supply and a negative voltage supply, respectively, and with the transistor bases connected for receiving inputs from a signal source; the emitter of the NPN transistor connected through, serially third and fourth resistors to said positive voltage supply, and the common junction of said third and fourth resistors being connected through a fifth resistor to a first input connection of a threshold detector circuit; the emitter of the PNP transistor connected through, serially, sixth and seventh resistor to said negative voltage supply, and the common junction of said sixth and seventh resistors being connected through an eighth resistor to a second in connection of said threshold detector circuit; the first and second input connections of said threshold detector circuit being interconnected by an even number plurality of series connected diodes with anodes toward said first connection and cathodes toward said second input connection, and with a diode cathode to anode connection between the innermost of said series connected diodes; the common junction of said first and second series connected resistors and said center diode cathode to anode connection being interconnected and connected through, serially, a signal coupling capacitor and the output load to one of said power supplies; and with an output of said threshold detector circuit being connected through protection control circuitry to said signal source.

UNITED STATES PATENT OFFICE
CERTIFICATE OF CORRECTION

Patent No. 3,585,514              Dated June 15, 1971

Inventor(s) Arthur P. Kubicz

It is certified that error appears in the above-identified patent and that said Letters Patent are hereby corrected as shown below:

Column 4, line 55, "hereinafter" should read -- hereinbefore --.
Column 7, line 12, "in" should read -- input --.
Column 8, line 3, after "first" insert -- input --; line 4, after "a" insert -- center --.

Signed and sealed this 11th day of April 1972.

(SEAL)
Attest:

EDWARD M. FLETCHER, JR.
Attesting Officer

ROBERT GOTTSCHALK
Commissioner of Patents